(12) United States Patent
Goldring

(10) Patent No.: US 11,434,162 B2
(45) Date of Patent: Sep. 6, 2022

(54) RADIATION PUMPED HEATER/HEATING ELEMENT

(71) Applicant: Soreq Nucelar Research Center, Yavne (IL)

(72) Inventor: Sharone Goldring, Yavne (IL)

(73) Assignee: Soreq Nuclear Research Center, Yavne (IL)

( * ) Notice: Subject to any disclaimer, the term of this patent is extended or adjusted under 35 U.S.C. 154(b) by 1175 days.

(21) Appl. No.: 15/769,748

(22) PCT Filed: Oct. 16, 2016

(86) PCT No.: PCT/IB2016/056197
§ 371 (c)(1),
(2) Date: Apr. 20, 2018

(87) PCT Pub. No.: WO2017/068475
PCT Pub. Date: Apr. 27, 2017

(65) Prior Publication Data
US 2020/0247711 A1    Aug. 6, 2020

Related U.S. Application Data

(60) Provisional application No. 62/244,289, filed on Oct. 21, 2015.

(51) Int. Cl.
*C03B 37/029* (2006.01)
*B23K 26/50* (2014.01)
*H05B 1/02* (2006.01)

(52) U.S. Cl.
CPC ............ *C03B 37/029* (2013.01); *B23K 26/50* (2015.10); *H05B 1/023* (2013.01); *C03B 2205/20* (2013.01)

(58) Field of Classification Search
None
See application file for complete search history.

(56) References Cited

U.S. PATENT DOCUMENTS

| | | | | |
|---|---|---|---|---|
| 4,012,213 A | * | 3/1977 | Haggerty | B23K 26/067 65/485 |
| 4,135,902 A | * | 1/1979 | Oehrle | C03B 37/029 65/392 |
| 4,584,464 A | | 4/1986 | Myer | |
| 4,785,156 A | * | 11/1988 | Benko | B23K 1/0056 219/121.63 |
| 4,879,454 A | | 11/1989 | Gerdt | |
| 5,021,630 A | * | 6/1991 | Benko | H05K 3/3421 219/121.64 |
| 5,814,784 A | * | 9/1998 | Kinsman | B23K 26/032 219/121.6 |
| 5,931,983 A | | 8/1999 | Bloom | |
| 6,543,256 B1 | | 4/2003 | Toru | |
| 9,977,169 B2 | * | 5/2018 | Kurt | F21S 41/176 |

(Continued)

OTHER PUBLICATIONS

PCT Search and Written Opinion PCT/IB2016/056197, dated Feb. 24, 2017.

*Primary Examiner* — Erin Snelting
(74) *Attorney, Agent, or Firm* — Dekel Patent Ltd.; David Klein

(57) ABSTRACT

A radiation pumped heater includes a ceramic substrate which is heated by a laser beam to a steady state temperature. An optical fiber is heated by conduction and radiation emitted from the ceramic substrate.

10 Claims, 4 Drawing Sheets

(56) References Cited

U.S. PATENT DOCUMENTS

| 2003/0012238 A1* | 1/2003 | Wu | G01J 1/32 |
| | | | 372/38.01 |
| 2009/0299353 A1* | 12/2009 | Lewinsky | A61B 18/28 |
| | | | 606/16 |
| 2009/0320527 A1 | 12/2009 | Harper | |

* cited by examiner

RADIATION PUMPED HEATER/HEATING ELEMENT

FIELD OF THE INVENTION

The present invention relates generally to heating elements, and particularly to steady-state heaters useful in certain processes, such as reducing diameters of optical fibers.

BACKGROUND OF THE INVENTION

Micro heat sources play a major role in fiber optics and glass processing. In general they need to provide a steady, clean and controllable heating zone at temperatures that approach 2000° C.

At present, there are four major techniques for achieving the required heat and which are used in commercial machines:
flame (usually hydrogen flame)
electric filament
arc discharge
direct laser absorption in the fiber or glass object.

Each technique has its advantages and disadvantages such that one technique may be suitable for certain processing conditions and not for others. Direct absorption of laser energy in the glass provides the cleanest heating source; however, due to high and dynamic heat convection to the surroundings, it is difficult to precisely and uniformly heat objects with diameters of a few microns. Moreover, some processes require very stable heating sources, which are difficult to produce with conventional laser and delivery optics.

An electric filament may be shaped to produce a highly uniform heating zone around the glass object. Its temperature can also be controlled by controlling the voltage and current that flows through it. Unfortunately, the commonly used electric filament needs to be kept in an inert environment and its lifetime is limited to about tens of minutes at working conditions. Moreover, electric filaments tend to contaminate the processed glass to some extent.

Arc discharge can provide high temperatures and be used to process large diameter fibers yet it suffers from long term stability issues and is not appropriate for delicate and thin adiabatic structures. It can also contribute to contamination as particles from the electrode collide with the processed glass.

Delicate and low-loss components with diameters of a few microns may be produced and processed using a gas flame torch. This heating source in general is less appropriate for large and non-symmetric glass objects mainly due to the relatively large heating zone and flame instability. Furthermore, OH contaminations are almost unavoidable when a gas flame is used. For some applications such contaminations are not desirable.

SUMMARY OF THE INVENTION

The present invention seeks to provide a radiation pumped heater, as is described more in detail hereinbelow.

The radiation pumped heater directs thermal radiation to a highly stable platform (e.g., ceramic platform), which absorbs the radiation, causing its temperature to rise. The heated platform functions as a heat capacitor, contributing to the process stability, and also functions as a clean, long-lived heat source. This concept allows flexibility in the processing techniques and is appropriate for processing both large fibers as well as delicate components of sub-micron diameters. The radiation pumped heater is not just applicable for fiber and glass processing, but may also be used for other processes that require a steady and clean heat source.

A ceramic substrate is used as a heater. Electromagnetic radiation from an external source is absorbed in the substrate. Since ceramics typically have poor thermal conductivity, the absorbed power is poorly dissipated by heat conduction. This in turn allows the buildup of high temperatures with relatively low incident powers. Furthermore, since the electromagnetic power can be delivered by a laser beam having high brightness, the heat source can be intense and small. Some ceramics such as zirconia (zirconium dioxide $ZrO_2$) have melting points at the range of 2500° C. and higher and are inert. The thermal conductivity of $ZrO_2$ is in the range of 1.8-2.2 W/m·K. Combining the nature of the ceramic substrate, the radiation source and the delivery technique can allow the formation of an effective heater or heating element in which the high ceramic temperature is dissipated to the surrounding as black body radiation and by convection, similarly to a standard electro-resistant heating element. Among the advantages of the invention are:

a. The ability to reach very high temperatures (above 2000° C.) in an atmospheric environment.

b. The ability to control the heat distribution with high resolution.

c. The ability to dynamically and accurately control the temperature of the heated zone.

d. The ability to use high purity materials with low vapor pressure suitable for non-contaminating presses.

Comparison with existing technologies:

The table below compares commercial optical fibers and glass processing machines:

|  | Manufacturer | | | |
| --- | --- | --- | --- | --- |
| Property | LIGHTEL | VYTRAN | AFL | Present Invention |
| Heating source | $H_2 + O_2$ Flame | Resistive filament | Direct $CO_2$ Laser interaction | Inert ceramic |
| Atmosphere composition | Hydrogen Oxygen compounds | Inert gas flow is needed (Argon) | Clean air | Clean air |
| Control of heat zone shape | Little (mainly width) | Little (mainly width) | Possible by shaping laser distribution | Possible by shaping laser distribution |

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
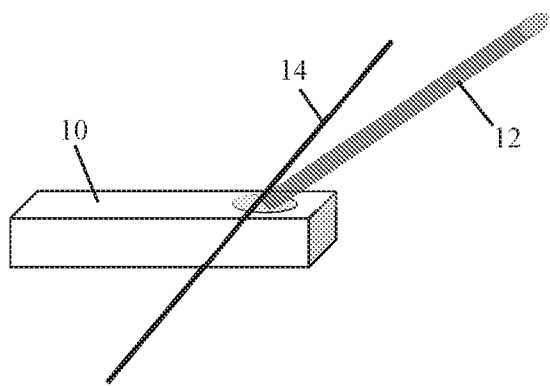
FIG. 1 is a simplified illustration of a radiation pumped heater, in accordance with a non-limiting embodiment of the invention, wherein an optical fiber is heated by conduction and radiation emitted from a ceramic substrate illuminated and heated by a laser beam.

Reference is now made to FIG. 1, which illustrates a radiation pumped heater, in accordance with a non-limiting embodiment of the invention, used for optical fiber processing. A ceramic substrate 10, such as a zirconia ceramic, is illuminated by a laser beam 12, such as a $CO_2$ laser beam. The laser beam 12 is strongly absorbed near the zirconia upper face which in turn rapidly heats until reaching a steady state. When appropriate conditions are established, a few watt $CO_2$ laser having a beam diameter of the order of one mm, can easily raise the laser-zirconia interaction zone to temperatures acceding 2000° C. in an atmospheric environment. An optical fiber 14 is heated by conduction and radiation emitted from the ceramic substrate 10. The ceramic substrate can maintain this high temperature for an hour or more.

Figure 2:
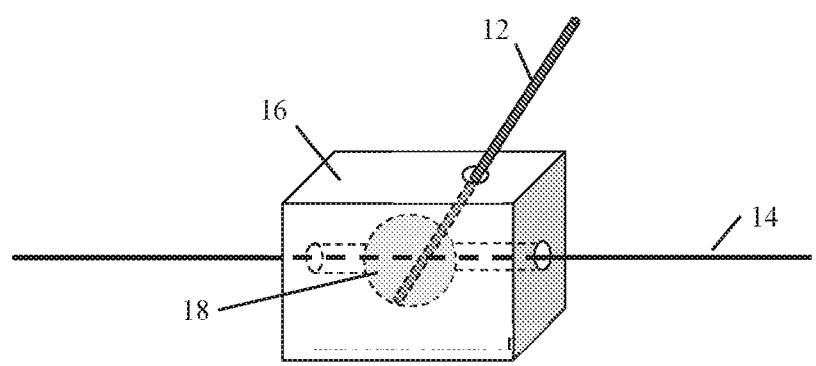
FIG. 2 is a simplified illustration of a furnace with a radiation pumped heater, in accordance with a non-limiting embodiment of the invention.

It is noted that the ceramic substrate 10 may be quite porous, and the volume of the pores may constitute 90% or more of the total volume. Such porosity lowers the thermal conductivity (the pores are basically air pockets and air has very poor thermal conductivity). The high porosity also affects the thermal shock resistance of the ceramic substrate 10. It has been found that the zirconia substrate behaved well in tests even when heated rapidly, Another application for such heating techniques is a miniature-sized furnace, as is now described with reference to FIG. 2. In this embodiment, a ceramic substrate 16 is formed with an internal cavity 18, thus forming a ceramic furnace. The laser beam 12 impinges upon the cavity 18 and heats up the ceramic furnace. The furnace may be used for heating optical fiber 14 in the treatment and production of fiber optic devices, such as but not limited to, tapers, couplers and combiners.

Figure 3:
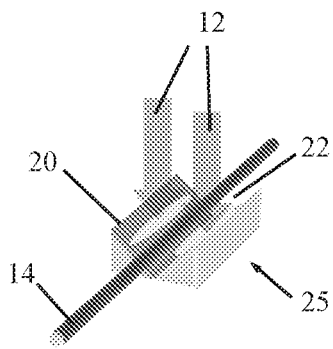
FIG. 3 is a simplified illustration of a radiation pumped heater that includes a ceramic substrate with a depression in which the fiber is placed, in accordance with a non-limiting embodiment of the invention.

Reference is now made to FIG. 3, which illustrates a radiation pumped heater 25 that includes a ceramic substrate 20 with a depression 22 in which the fiber 14 is placed. The substrate 20 is heated by a pair of laser beams 12 symmetrically on opposite sides of the fiber 14. Thus, in FIG. 1, the laser beam impinges on the optical fiber, whereas in FIG. 3, the beams do not impinge on the fiber.

Figure 4:
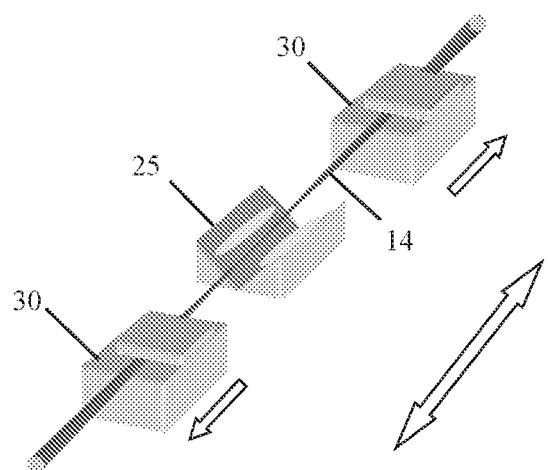
FIG. 4 is a simplified illustration of processing the optical fiber with the radiation pumped heater, in accordance with a non-limiting embodiment of the invention.

Reference is now made to FIG. 4, which illustrates processing the optical fiber 14 with the radiation pumped heater 25, in accordance with a non-limiting embodiment of the invention. Two opposite ends of the fiber 14 are held by holding elements 30, such as clamps. The middle portion of the fiber is heated by the heater 25 of FIG. 3. After heating the fiber to a temperature that permits drawing the fiber to a reduced diameter, the holding elements 30 are moved in opposite directions; this causes the middle portion of the fiber to be drawn thinner to a reduced diameter. The process can be carefully and precisely controlled to achieve precise diameters. Heating over the reduced diameter portion should be done uniformly.

Figures 5A, 5B, 5C:
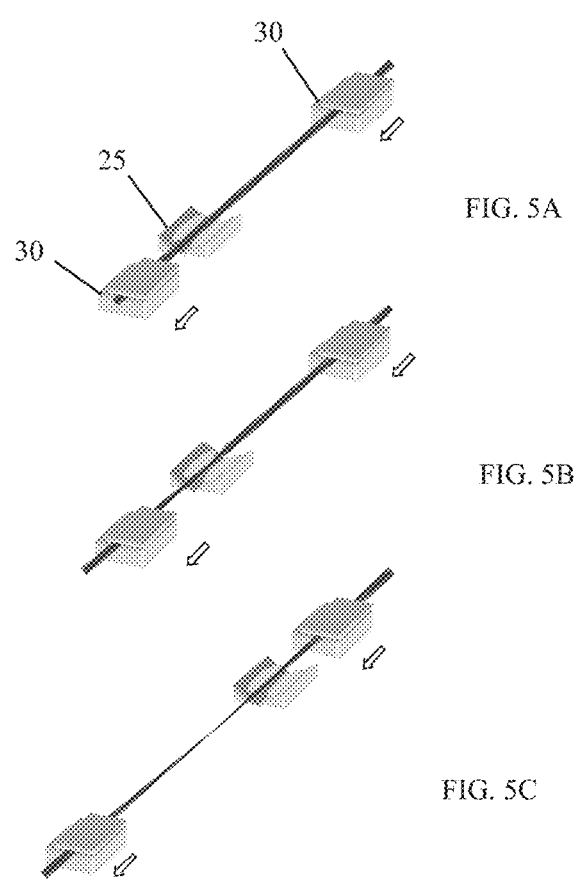
FIGS. 5A-5C are simplified illustrations of processing the optical fiber with the radiation pumped heater, in accordance with another non-limiting embodiment of the invention.

Reference is now made to FIGS. 5A-5C, which illustrate processing the optical fiber 14 with the radiation pumped heater 25, in accordance with another non-limiting embodiment of the invention. Here again, two opposite ends of the fiber 14 are held by holding elements 30 and the middle portion of the fiber is heated by heater 25. After heating the fiber to a temperature that permits drawing the fiber to a reduced diameter, the holding elements 30 are initially moved in the same direction at the same velocity (FIG. 5A). Afterwards, the proximal holder 30 (that feeds the fiber to heater 25) is slowed so that the distal holder 30 moves faster (FIG. 5B). This causes the middle portion of the fiber to be drawn thinner to a reduced diameter. Afterwards, the velocity of the proximal holder 30 can be modified, for example, to match that of the distal holder 30 so that the holders move at the same velocity (FIG. 5C); or alternatively moved at different speeds. The diameter and length of the fiber portion with the reduced diameter process can be carefully and precisely controlled, depending on the relative velocities of the holders, temperature and fiber properties, among other factors. Typically, but not necessarily, the method of FIG. 4 (holding elements 30 are moved in opposite directions) is applicable for thicker fibers than the method of FIG. 5.

Figure 6:
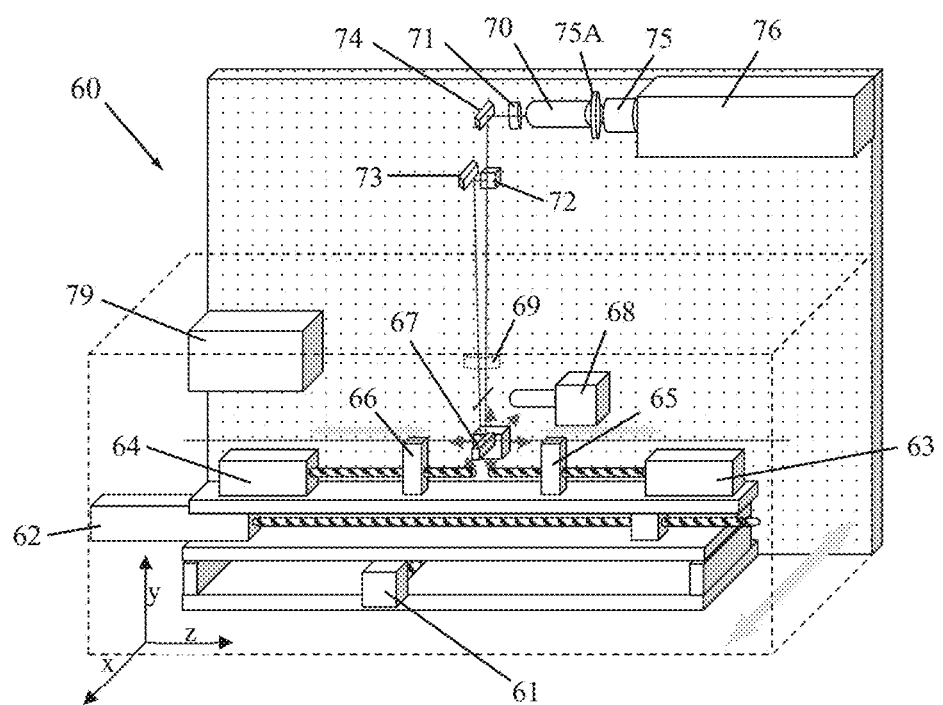
FIG. 6 is a simplified illustration of apparatus for processing optical fibers, in accordance with a non-limiting embodiment of the invention.

Reference is now made to FIG. 6, which illustrates apparatus 60 for processing optical fibers, in accordance with a non-limiting embodiment of the invention.

Apparatus 60 includes holders 65 and 66 for holding an optical fiber 14. Motors or actuators 63 and 64 control and establish the relative position of holders 65 and 66, respectively. Motors 63 and 64 and holders 65 and 66 are all mounted on a moving table for movement in the x- and z-axes. The moving table may include a base which is moved by a motor or actuator 61 along the x-axis and another base which is moved by a motor or actuator 62 along the z-axis.

The central portion of the fiber is heated by a radiation pumped heater 67. Camera(s) 68 provide visual monitoring and measurement of the heating and drawing process. A laser 76 (e.g., $CO_2$ laser) emits a laser beam via a safety shutter 75 and half-wavelength plate 75A (for controlling the beam polarity) to a variable zoom telescope 70. The beam passes from the telescope 70 to a cylindrical lens 71, and is then reflected by a mirror 74 to the work area of the fiber. A beam splitting polarizer 72 splits the beam and one of the beams is directed by another mirror 73 to the work area. Both beams that are directed to the work area may pass through a spherical mirror 69. The beams are directed on the ceramic substrate of heater 67 on opposite sides of the fiber 14 (or on the fiber), as described above.

The telescope 70 is used to control the spot size of the beam on the ceramic and/or fiber. A controller 79 may be provided for controlling the various elements of the apparatus for controlling the process to desired parameters.

The invention has been described above for use with reducing the diameter of an optical fiber. The invention may also be used for thinning and melting more than one fiber and fibers that have different mechanical and/or optical properties. For example, the invention may also be used for producing optical couplers and other optical devices, and for thinning tubes and other structures.

What is claimed is:

1. A method for processing an optical fiber comprising:
    heating a portion of an optical fiber with a radiation pumped heater, the heater comprising a ceramic substrate which is heated by a laser beam to a steady state temperature, and wherein said optical fiber is heated by conduction and radiation emitted from the ceramic substrate;
    drawing the optical fiber to reduce a diameter of the heated portion;

holding said optical fiber with a proximal holder and a distal holder located on opposite sides of the heated portion, and moving said proximal and distal holders to draw the heated portion of said fiber to the reduced diameter, and wherein said proximal holder is moved at a different velocity than said distal holder at some stage in the method.

2. The method according to claim 1, wherein after heating the optical fiber to a temperature that permits drawing the fiber to a reduced diameter, said proximal and distal holders are initially moved in the same direction at the same velocity, and afterwards, said proximal holder is slowed and said distal holder moves faster than said proximal holder.

3. The method according to claim 1, wherein said holders move in the same direction.

4. The method according to claim 1, wherein said holders move in different directions.

5. The method according to claim 1, wherein said ceramic substrate is heated by another laser beam on a side of said optical fiber opposite to said first-mentioned laser beam.

6. The method according to claim 5, wherein said laser beams are symmetrically located on opposite sides of said optical fiber.

7. The method according to claim 1, wherein said laser beam is emitted via a safety shutter and a half-wavelength plate to a variable zoom telescope, and said laser beam passes from said telescope to a cylindrical lens and is then reflected by a mirror to a work area of said optical fiber.

8. A method for processing an optical fiber comprising:
heating a portion of an optical fiber with a radiation pumped heater, the heater comprising a ceramic substrate, and wherein said optical fiber is heated by conduction and radiation emitted from the ceramic substrate; and
drawing the optical fiber to reduce a diameter of the heated portion;
wherein said ceramic substrate is heated by a pair of laser beams on opposite sides of said optical fiber to a steady state temperature.

9. The method according to claim 8, wherein said laser beams are symmetrically located on opposite sides of said optical fiber.

10. The method according to claim 8, wherein for each of said laser beams, said laser beam is emitted via a safety shutter and a half-wavelength plate to a variable zoom telescope, and said laser beam passes from said telescope to a cylindrical lens and is then reflected by a mirror to a work area of said optical fiber.

* * * * *